United States Patent [19]
Toko et al.

[11] Patent Number: 5,453,862
[45] Date of Patent: Sep. 26, 1995

[54] RUBBING-FREE (CHIRAL) NEMATIC LIQUID CRYSTAL DISPLAY

[75] Inventors: Yasuo Toko; Takashi Sugiyama, both of Yokohama; Shunsuke Kobayashi, 3-13-40, Nishi-Oizumi, Nerima-ku, Tokyo, all of Japan

[73] Assignees: Stanley Electric Co., Ltd.; Kobayashi; Shunsuke, both of Tokyo, Japan

[21] Appl. No.: 115,441

[22] Filed: Sep. 1, 1993

[30] Foreign Application Priority Data

Sep. 4, 1992 [JP] Japan ................................. 4-236652

[51] Int. Cl.$^6$ ........................... G02F 1/1337; G02F 1/13
[52] U.S. Cl. ........................... 359/76; 359/78; 359/102
[58] Field of Search ........................... 359/62, 76, 78, 359/80, 102

[56] References Cited

U.S. PATENT DOCUMENTS

| | | | |
|---|---|---|---|
| 3,503,673 | 3/1970 | Heilmeier et al. | 359/91 |
| 4,239,345 | 12/1980 | Berreman et al. | 359/76 |

FOREIGN PATENT DOCUMENTS

| | | | |
|---|---|---|---|
| 0497619A3 | 8/1992 | European Pat. Off. . | |
| 63-256922 | 10/1988 | Japan | 359/62 |
| 1300223 | 12/1989 | Japan | 359/62 |
| 2273718 | 11/1990 | Japan | 359/62 |

OTHER PUBLICATIONS

DeZwart, et al, "Electric . . . Anisotropy", Physics Letters, vol. 55A, No. 1, Nov. 1975, pp. 41–42.
Dietrich Meyerhofer, "Optical Transmission of Liquid-Crystal Field-Effect Cells", Sep. 20, 1976, Journal of Applied Physics, pp. 1179–1185.
Toko et al, "Amorphous Twisted Nematic-Liquid-Crystal Displays Fabricated by Nonrubbing Showing Wide and Uniform Viewing-Angle Characteristics Accompanying Excellent Voltage Holding Ratios", Aug. 1, 1993, Journal of Applied Physics, pp. 2071–2075.

*Primary Examiner*—William L. Sikes
*Assistant Examiner*—Ron Trice
*Attorney, Agent, or Firm*—Frishauf, Holtz, Goodman, Langer & Chick

[57] ABSTRACT

A liquid crystal display element does not include an orientation layer for orienting a liquid crystal material injected between a pair of substrates thereof. Liquid crystal molecules in the liquid crystal material are oriented randomly in random directions between the substrates. Macroscopically, the liquid crystal molecules of the liquid crystal material are oriented omnidirectionally in a substrate in-plane direction, so that the molecules have an equal random probability of orientation in each direction. Microscopically, however, the liquid crystal molecules of the liquid crystal material are unidirectionally oriented. Among the types of possible orientations are: a type wherein micro-domains in the liquid crystal material are respectively oriented in one direction and occupy an entire micro-area of a substrate in-plane direction; another type of orientation includes a type wherein a plurality of micro-domains are dispersively distributed; and still another type of domain is a type wherein random changes in orientation occur in the micro-domains; and a still further type of orientation of the liquid crystal molecules has random changes in orientation in a broad area. Since the orientations are generally omnidirectional in a substrate in-plane direction; it is possible to form a liquid crystal display element in combination with a pair of polarizers. Optical anisotropy in the in-plane direction and adverse effects of rubbing are prevented.

11 Claims, 5 Drawing Sheets

RUBBING-FREE (CHIRAL) NEMATIC LIQUID CRYSTAL DISPLAY

BACKGROUND OF THE INVENTION a) Field of the Invention

The present invention relates to a liquid crystal display element and a method of manufacturing the same, and more particularly to such an element and method capable of improving an angle subtended by the field of view.

b) Description of the Related Art

In a liquid crystal display element or liquid crystal cell used by a liquid crystal display or the like, the orientation of liquid crystal molecules is changed to a different orientation by externally applying an electric field or the like. A change of this optical property is used to change a visual observation provided by the display element in order to provide a particular orientation of liquid crystal molecules under no electric field, an orientation process is generally performed on surfaces of glass substrates which hold the liquid crystal layer.

As a conventional orientation process for a twisted nematic (TN) liquid crystal cell, a so-called rubbing process has been used in which glass substrates holding a liquid crystal layer are rubbed by cotton cloth or the like.

For example, upper and lower substrates are rubbed in two orthogonal directions. For a negative display of a liquid crystal cell, polarizers of parallel configuration are disposed outside of the cell in such a manner that one of the rubbing directions aligns with the polarization axes of the polarizers. For a positive display, polarizers of crossed configuration are disposed in such a manner that the polarization axes become in parallel or perpendicular to the orthogonal rubbing directions.

The orientation of liquid crystal molecules becomes uniform by the rubbing orientation process. As a result, an angle of field of view is limited to a particular range within which the user can observe a display screen clearly.

FIG. 4A shows an example of equi-contrast curves indicating the characteristic of an angle of field of view of a TN phase liquid crystal cell. In FIG. 4A, the normal line direction of a liquid crystal cell is represented by $\Theta=0$, wherein the angle $\Theta$ represents the radial angle relative to the normal line. The observing position in the horizontal plane is represented by an azimuth angle $\phi$. The definitions of these angles are illustrated in FIG. 4B.

Thick solid curves in FIG. 4A are equi-contrast curves which are given contrast values. As seen from FIG. 4A, an angle of Field of view with a high contrast is limited to a particular range. Such a liquid crystal cell has a dependency on an angle of field of view wherein one direction provides a clear observation and another direction provides an unclear observation.

If the liquid crystal cell having the characteristic of an angle of field of view shown in FIG. 4A is used in a display device, the contrast lowers extremely at some angle relative to the display screen (in the example shown in FIG. 4A, near at $\phi=180$ degrees). In a radical case, contact inversion occurs on the display screen.

The characteristic of an angle of field of view such as shown in FIG. 4A results from pre-tilts, shown in FIG. 5, of liquid crystal molecules caused by rubbing. The direction of pre-tilts of liquid crystal molecules, when projected on the substrate, coincides with the rubbing vector direction indicated by an arrow line in FIG. 5.

When a voltage is applied to a liquid crystal cell, liquid crystal molecules rise along the pre-tilt direction. Therefore, the optical rotary power tends to vanish when viewed from the pre-tilt direction on the mid-plane in the cell. The direction providing the clearest observation is therefore in this direction.

During rubbing, static electricity may be generated by friction, resulting in a possible insulation breakdown of an orientation film, or a deflective orientation and poor display. In the case of a liquid crystal cell of an active matrix (AM) drive type having drive elements such as thin film transistors (TFT), and wirings formed on the surface of the cell, static electricity caused by rubbing may destroy elements and wirings. Also in the case of a simple matrix type, fine wiring may be broken down or destroyed.

A great, amount of fine dusts are produced during the orientation film Forming or rubbing. Dusts attached to the substrate by static electricity may cause display defects such as an insufficient gap, black and white dots on the display cell.

SUMMARY OF THE INVENTION

It is an object of the present invention to provide a liquid crystal display element and a method of manufacturing the same, capable of improving the characteristic of an angle of field of view and avoiding problems ascribed to rubbing.

According to one aspect of the present invention, there is provided a liquid crystal display element having a pair of substrates and a liquid crystal layer held between the pair of substrates, the liquid crystal layer includes at least one of a chiral nematic liquid crystal and nematic liquid crystal, wherein the orientation of liquid crystal molecules of the liquid crystal layer is macroscopically omnidirectional in the substrate in-plane direction with an equal probability of orientation in each direction, and the liquid crystal molecules provide generally a constant twist angle in a direction perpendicular to the planes of the substrates forming the cell. When a nematic liquid crystal is used, no twist is generated. However, the liquid crystal molecules are aligned in one direction in each micro-domain across the thickness of the liquid crystal layer.

Microscopically, the orientation of liquid crystal molecules is randomly distributed in the substrate in-plane. Therefore, the characteristic of an angle of field of view is generally uniform in the omnidirection, and the contrast of the display screen will not lower at any position of an observer. A chiral nematic liquid crystal rotates the polarization axis of incident light by a predetermined angle in the direction perpendicular to the substrate. A pair of polarizers is used to realize a positive or negative display. Since a rubbing process is not performed, the breakage of elements and wirings will be reduced, and a display defect caused by the generation and attachment off dust can also be reduced. Other problems associated with rubbing will not occur.

If an orientation film is not formed, the cell will be free from after images, burning, or the like caused by the orientation process.

If a rubbing process or an orientation film forming process is not performed, the manufacturing cost can be reduced.

DETAILED DESCRIPTION OF THE PREFERRED EMBODIMENTS

Figure 1A:
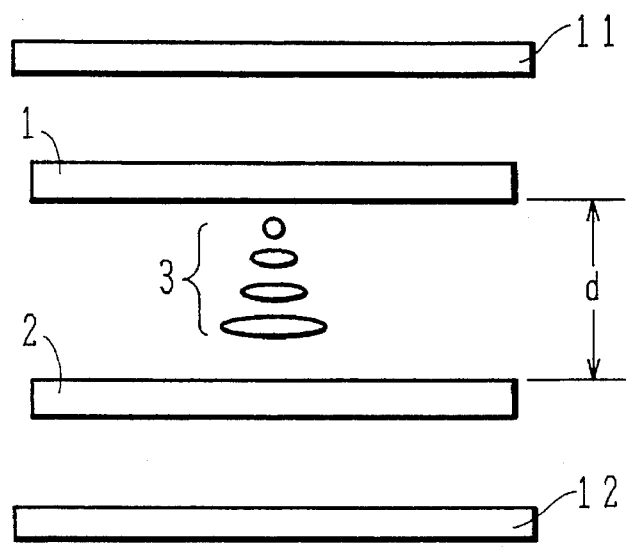
FIG. 1A is a cross sectional view of a liquid crystal display cell according to an embodiment of the present invention.

An embodiment of the invention will be described with reference to FIGS. 1A to 1C. FIG. 1A is a schematic cross section of a liquid crystal display cell according to the embodiment of the invention. Chiral nematic phase liquid crystal molecules 3 are interposed between transparent glass substrates 1 and 2.

In manufacturing this liquid crystal cell, processes of conventional techniques can be used. However, rubbing is not carried out. If an orientation process such as rubbing is not performed intentionally, it can be considered at least approximately that liquid crystal molecules are oriented in parallel in one direction as viewed at each micro region on the substrate surface.

If the molecules are viewed collectively at a larger region, there are a multiple of these micro regions (micro domains) in the larger region. The orientation of liquid crystal molecules within each multi domain is omnidirectional so that the orientation of the molecules occurs in all directions at the same probability.

it can be therefore approximated that the orientation of molecules within the cell at one surface thereof is as a whole omnidirectional and that the orientation of the molecules at each micro domain is as a whole unidirectional.

Figure 1B:
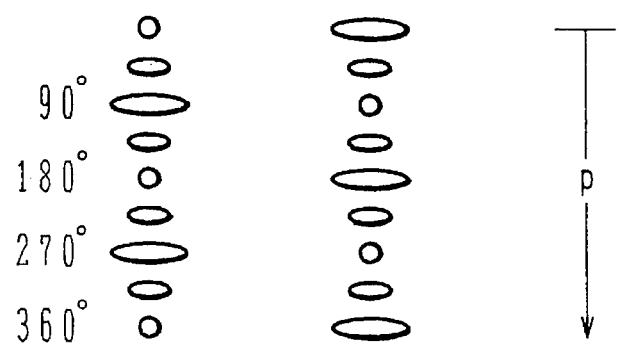
FIG. 1B is a schematic diagram explaining a chiral pitch of liquid crystal.

As shown in FIG. 1B, the orientation of a chiral nematic liquid crystal rotates 360 degrees at a chiral pitch p. Liquid crystal molecules show the twist structure that they gradually twist as the distance from one substrate surface becomes longer, and take an angle defined by d/p at the other substrate surface where d is a thickness of the liquid crystal layer in the direction perpendicular to the planes of the glass substrates. For a nematic liquid crystal, p is infinite. Respective multi domains within the cell are subject to such a twist so that the orientations of the molecules at opposite surfaces of the cell differ by a definite twist angle, while providing similar multi domain structures.

A chiral nematic liquid crystal display cell is formed while satisfying the condition of 0 (or nearly 0)<d/p< 0.75 (or nearly 0.75). Preferably, such a cell will satisfy the condition of 0.15< d/p<0.75. In other words, the parameters p and d are determined so that the optical rotation angle from 54 degrees to 270 degrees can be obtained.

For example, liquid crystal is injected between the transparent glass substrates 1 and 2, satisfying d/p=0.25 (corresponding to a twist angle of 90 degrees).

As the liquid crystal material, any known nematic liquid crystal and cholestric liquid crystal may be used. Nematic liquid crystal is given a twist by using a chiral additive.

Figure 1C:
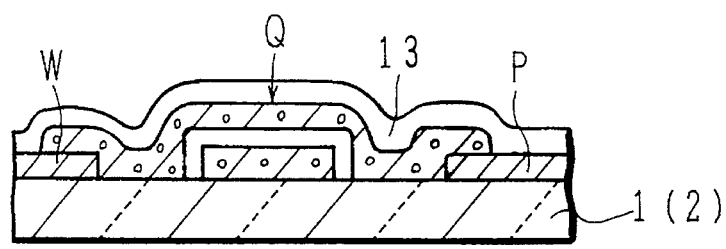
FIG. 1C is a cross sectional view showing the structure of a substrate for a liquid crystal cell.

As shown in FIG. 1C, in the case of a liquid crystal display element of an active drive type, there are formed, on the surface of the glass substrates 1 or 2, a drive element Q such as a thin film transistor (TFT) made of amorphous Si or polycrystalline Si, a wiring W made of metal such as Cr, a transparent pixel electrode P made of indium tin oxide (ITO), and other elements. The surface of the display element is preferably covered with a protective insulating film 13. Black stripes, color filters, and the like may also be formed. A common electrode is formed on the whole surface of the counter substrate 1 or 2. In the case of a liquid crystal display element of a simple matrix type, groups of wirings are formed on the opposite substrates, the upper wirings being disposed crossing the lower wirings. A protective insulating film or an orientation film may or may not be formed on the substrate. Rubbing is not carried out.

In the case of d/p=0.25, for example, liquid crystal molecules in micro domains have a twist of 90 degrees at the opposite substrate surfaces. However, the orientation of liquid crystal molecules in multi domains each containing a multiple of micro domains is omnidirectional.

The display quality of a liquid crystal cell becomes better if, in the manufacture, the liquid crystal is maintained at a temperature of the N-I (Nematic-Isotropic) phase transition point or higher and injected in the isotropic phase into the cell to thereafter gradually lower the temperature below the N-I point.

It is preferable that both the liquid crystal and the substrates be maintained at a temperature of the N-I point or higher when the liquid crystal material is injected into the cell and thereafter is gradually lowered the temperature below the N-I point. The display quality of a manufactured liquid crystal cell can be improved further.

From the fact that bulk liquid crystal (liquid crystal with no external orientating force) will exhibit multi domain characteristics, it can be anticipated that a cell without an orientation compulsion force will have the multi domain structure. This tendency is enhanced particularly for a display cell whose liquid crystal molecules have been injected at the temperature of the N-I point, or higher, and wherein each domain size in the multi domain with become more uniform.

Polarizers disposed outside of the liquid crystal cell are crossed for a positive display, and are parallel for a negative display. The in-plane angle of the polarizing axis of the polarizers are optional as understood from no reference direction such as a rubbing direction on the planes of the substrates.

In the case of d/p=0.25, incident polarized light having the polarization direction parallel to or orthogonal to the orientation of liquid crystal molecules of the multi domains at the substrate surface is outputted as polarized light twisted by 90 degrees by the optical rotation function of the liquid crystal molecules, as in the case of a usual TN cell.

In contrast with the above, incident polarized light having the polarization direction not parallel or not orthogonal is outputted as polarized light having a twist angle determined by the optical rotary power plus retardation ($\Delta n * d$: $\Delta n$ is a refractivity anisotropy off liquid crystal), the twist angle being dependent upon the wavelength of incident light.

Accordingly, light transmitted through the multi domains and the output polarizer is colored. However, because the orientation of liquid crystal molecules in the multi domains is omnidirectional with an equal probability of orientation in each direction, the total wavelength dependency of the output light is cancelled out and the transmission without coloring will be obtained for the positive display when no external orientation compulsion force is applied.

Figure 2:
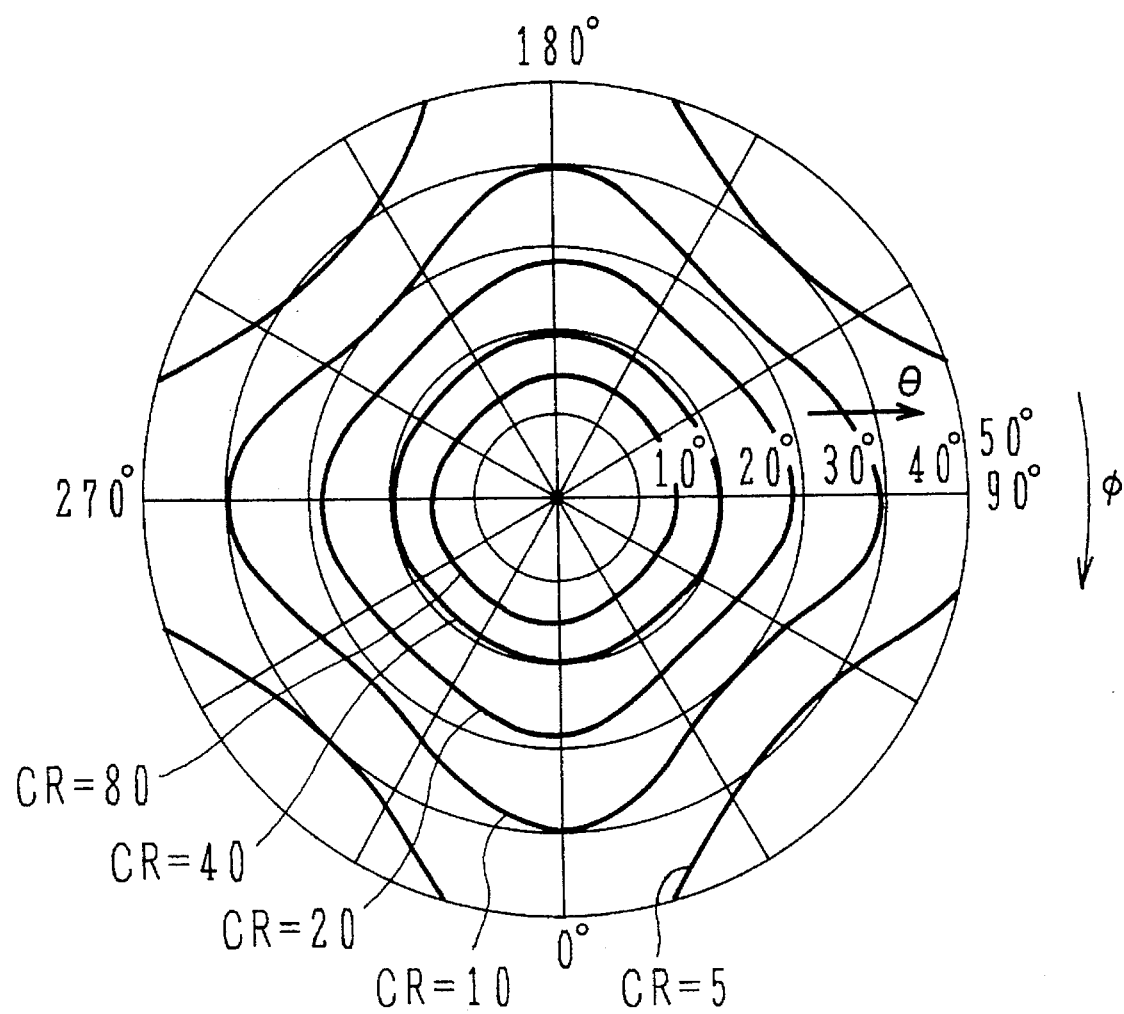
FIG. 2 shows the characteristic off an angle of field of view of the liquid crystal cell according to the embodiment of the present invention.

FIG. 2 shows the characteristic of an angle of field off view of the liquid crystal cell manufactured in the manner described above. In manufacturing a test cell, liquid crystal commonly used for a display cell with TFTs and having a refractivity anisotropy Δn=0.095 of birefringence was injected into the test cell having a gap of 5.5 μm between substrates with a transparent electrode film (of ITO).

The test cell was not formed with an orientation film, and the liquid crystal was injected while maintaining both the liquid crystal and substrates at a temperature of the N-I point or higher. Polarizers of a neutral high polarization type (G-1220, available from Nitto Electric industrial Co., Ltd., Japan) were disposed in crossed configuration with the polarizing axes being set in the directions (0 to 180 degrees) and (90 to 270 degrees), to obtain a positive display type test cell.

Figure 4A:
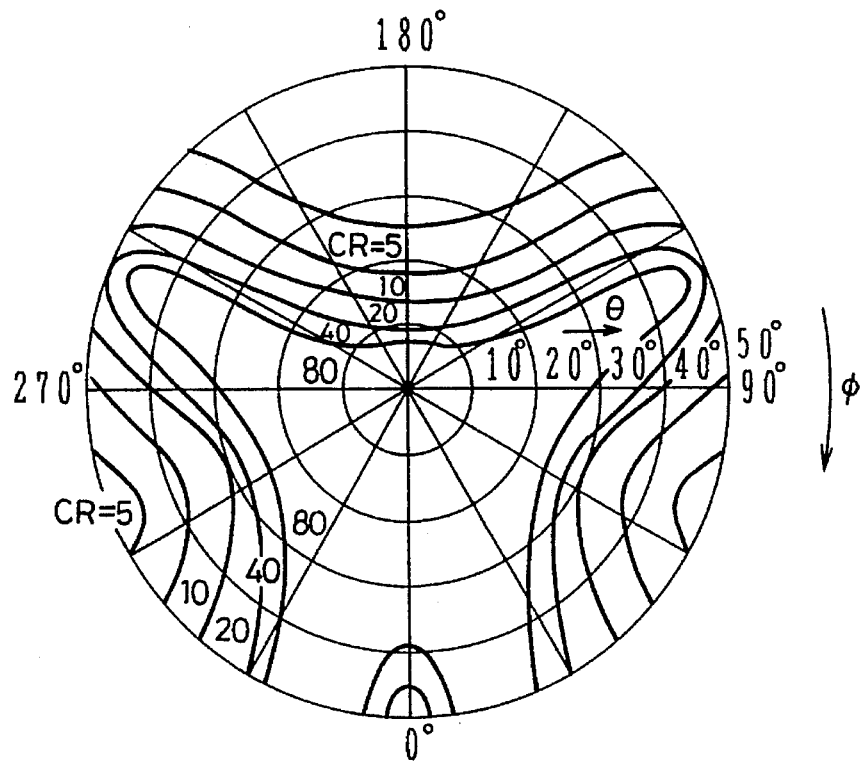
FIGS. 4A and 4B are diagrams showing the characteristic of an angle of field of view and illustrating the definition of angles, according to a conventional technique.
Figure 4B:
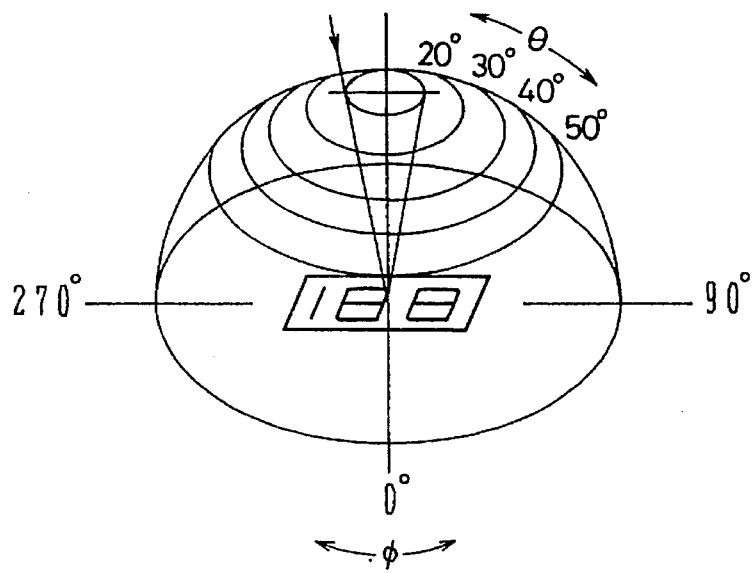
Figure 5:
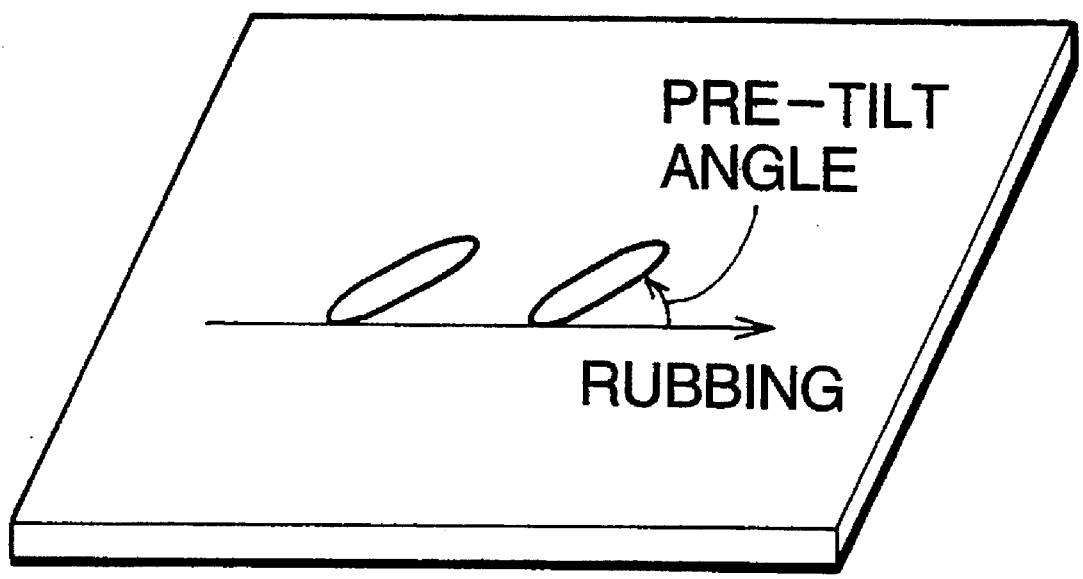
FIG. 5 is a diagram explaining pre-tilt caused by rubbing.

As seen from FIG. 2, the test cell manufactured in the same manner of the above embodiment had generally the same characteristic of an angle off field of view in the omnidirection, and did not show the degradation of contrast at any particular angle of field of view as in the conventional liquid crystal cell shown in FIG. 4A.

The structure of the test cell was observed with a polarization microscope, and fine multi domains formed on the whole region of the cell were observed. This may account for the absence of the dependency of the angle of field of view.

Namely, a number of multi domains are generated on the display surface, and liquid crystal molecules are distributed as a whole in the omnidirection in the plane parallel to the substrates. Therefore, the polarization axis off the Final output light is rotated by 90 degrees. A combination of the 90-degree polarization axis rotation and the crossed polarizers allows a liquid crystal display to operate so that the. The dependency of the angle of field off view is eliminated by the multi domains.

The angles of the polarization axes are optional because of the multi domain structure. The angles of the polarizers were changed actually, but no difference of the display characteristic was observed. In the case of a negative display with the parallel polarizers, there was a tendency of insufficient black when the external orientation compulsion force was not applied, because of the wavelength dependency described above. The positive display is therefore more preferable.

In the embodiment described above, the orientation process is not carried out intentionally. It has been found recently, however, that an orientation process is possible without a rubbing process. For example, a polarization memory film is used to obtain particular orientation through polarized light radiation. Even with such an orientation, the multi domain structure and the advantageous effects were the same as the above embodiment.

As the optical polarization memory film, the following and other materials may be used:

(1) Silicon polyimide doped with diazo amine dye: Wayne M. Gibbons et al. "NATURE", Vol. 351 (1991), p.49.

(2) Polyvinyl alcohol (PVA) doped with azo-based dye: Yasufumi IIMURA et al. "18-th Liquid Crystal Conference" —The Chemical Society of Japan, 64-th Annual Meeting in Spring—, p. 34, on Sep. 11, 1992, an association of the Chemical Society of Japan, or Jpn. J. Appl. Phys. Vol.32 (1993), pp. 2155 to 21164.

(3) Photo polymerized photopolymer: Martin Schadt et al. Jpn. J. Appl. Phys. Vol.31 (1992), pp.2155 to 2164.

Figure 3A:
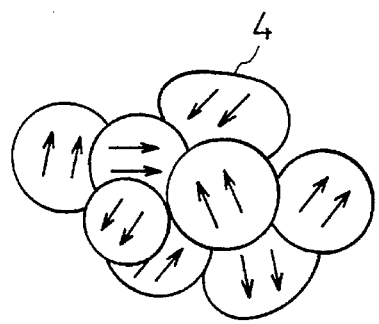
FIGS. 3A to 3C are enlarged schematic diagrams showing the orientation of liquid crystal molecules of liquid crystal cells according to embodiments of the present invention.

The multi domain structure of the above embodiment is shown in an enlarged schematic diagram of FIG. 3A. FIG. 3A is an enlarged plan view of the display cell. A number of micro domains 4 are formed, and liquid crystal molecules of each domain 4 are oriented generally in parallel in one direction as indicated by the arrows. However, molecules in the cell as a whole are oriented randomly when viewed macroscopically. It can be understood therefore the characteristic of an angle of field of view is substantially isotropical.

Orientation structures different from the multi domain structure shown in FIG. 3A can be obtained by changing the liquid crystal cell manufacturing conditions of the embodiment method.

Figure 3B:
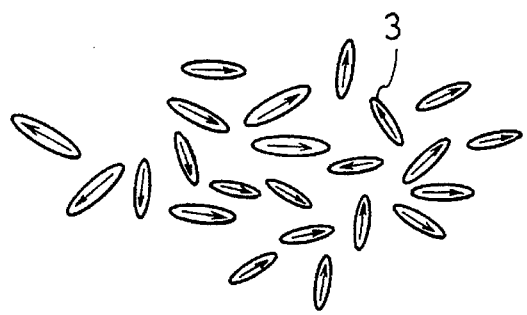

The structure shown in FIG. 3B has liquid crystal molecules 3 successively changing their orientation. The orientation of the cell as a whole is random, and liquid crystal molecules 3 are oriented omnidirectionally with the an equal probability of orientation in each direction.

Figure 3C:
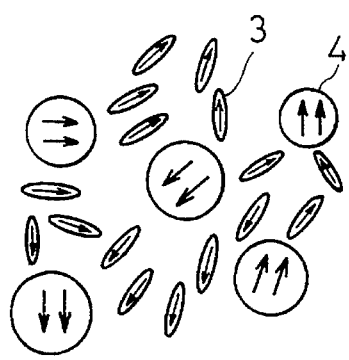

The structure shown in FIG. 3C is a combination of the structures shown in FIGS. 3A and 3B. Micro domains 4 are distributed and oriented each in one direction, and liquid crystal molecules 3 which are randomly oriented are present among the micro domains 4. Also in this case, molecules in the cell as a whole are oriented randomly.

It is apparent, that any one of the structures shown in FIGS. 3A to 3C can provide the above-described advantageous effects.

The present invention is not limited only to the embodiments described above, but, various alterations, modifications and changes may be made easily by those skilled in the art from the contents of the disclosure.

We claim:

1. A liquid crystal display element that does not include an orienting means for unidirectionally orienting a plurality of liquid crystal molecules of a liquid crystal material in said element, said liquid crystal display element comprising:

a pair of substrates; and a liquid crystal layer held between the pair of substrates;

the liquid crystal layer consisting essentially of one of a chiral nematic liquid crystal material and a nematic liquid crystal material; and wherein:

an orientation of the plurality of liquid crystal molecules of said liquid crystal layer being macroscopically omnidirectional with respect to directions in a plane parallel to said pair of substrates so that there is an equal probability of orientation of a molecule in each of a plurality of directions in said plane; and said liquid crystal molecules providing a continuous domain having one of a constant and no twist angle in a direction perpendicular to said plane parallel to said pair of substrates.

2. A liquid crystal display element according to claim 1, wherein said liquid crystal layer has a plurality of microdomains in an in-plane direction of one of said substrates and wherein the orientation of the liquid crystal molecules in each of said micro-domains is a unidirectional orientation adjacent to each of the substrates.

3. A liquid crystal display element according to claim 2, further comprising:

means for providing a polarized light to a light input side of said liquid crystal display element.

4. A liquid crystal display element according to claim 2, wherein:

said plurality of micro-domains includes micro-domains of a first kind wherein the liquid crystal molecules have successively changing orientations relative to the substrate in-plane direction of said one substrate; and said micro-domains of the first kind are distributed among said plurality of micro-domains whereby at least some of said plurality of micro-domains have molecules that are unidirectionally oriented.

5. A liquid crystal display element according to claim 1, wherein the orientation of the liquid crystal molecules in said liquid crystal layer generally randomly changes microscopically relative to said plane parallel to said pair of substrates.

6. A liquid crystal display element according to claim 1, wherein when:

the liquid crystal material includes a chiral liquid crystal material; and said pair of substrates are spaced apart from each other by a gap distance d;

then the following relationship is substantially satisfied by the display element;

(about) $0 < d/p <$ (about) $0.75$;

where p is a chiral pitch of said chiral liquid crystal material.

7. A method of manufacturing a liquid crystal display element which has no means for unidirectionally orienting a plurality of liquid crystal molecules of a liquid crystal material in said element, comprising the steps of:

preparing a pair of transparent substrates having no unidirectional orientation means provided thereon;

injecting a liquid crystal material consisting essentially of one of a chiral nematic liquid crystal material and a nematic liquid crystal material between said pair of transparent substrates such that a multi-domain structure is formed in the injected liquid crystal material; and wherein said multi-domain structure is formed such that a plurality of micro-domain structures are formed within said multi-domain structure, each micro-domain structure having a different orientation direction, each micro-domain structure extending between the pair of substrates and each micro-domain structure having a unidirectional orientation direction adjacent to each of the substrates, and said liquid crystal molecules providing a continuous domain having one of a constant and no twist angle in a direction perpendicular to a plane parallel to said pair of substrates.

8. The method according to claim 7, wherein said at least one of a chiral nematic liquid crystal material and a nematic liquid crystal material is injected into said liquid crystal display element while maintaining said at least one liquid crystal material at a temperature equal to or above an N-I temperature point of said at least one liquid crystal material.

9. The method according to claim 7, wherein said at least one of said chiral nematic liquid crystal material and said nematic liquid crystal material is injected into the liquid crystal display element while maintaining said pair of transparent substrates at a temperature that is equal to or above an N-I temperature point of said at least one liquid crystal material.

10. A method according to claim 7, wherein when:

said liquid crystal material includes a chiral liquid crystal material; and d is a thickness dimension of a liquid crystal layer held between said pair of transparent substrates;

then the following relationship is substantially satisfied by the display element;

(about) $0 < d/p <$ (about) $0.75$;

where p is a chiral pitch of said chiral nematic liquid crystal material.

11. A crystal display element that does not include an orientation means for unidirectionally orienting a plurality of liquid crystal molecules in a liquid crystal material provided in said liquid crystal display element, said liquid crystal display element comprising:

a pair of substrates; and a liquid crystal layer held between the pair of substrates;

the liquid crystal layer consisting essentially of one of a chiral nematic liquid crystal material and a nematic liquid crystal material; and wherein:

an orientation of liquid crystal molecules of said liquid crystal layer is macroscopically omnidirectional with respect to directions in a plane parallel to the pair of substrates so that there is an equal probability of orientations of a molecule in each of a plurality of directions in said plane;

said liquid crystal molecules provide a continuous domain having one of a constant and no twist angle in a direction perpendicular to said plane parallel to said substrates;

said liquid crystal layer has a plurality of micro-domains in an in-plane direction of said pair of substrates; and an orientation of the plurality of liquid crystal molecules in each of said micro-domains is unidirectional.

* * * * *